United States Patent Office 2,963,400
Patented Dec. 6, 1960

2,963,400
PRODUCT AND PROCESS FOR PREVENTION AND CURING OF DISEASE IN AQUARIUM FISH

Edward J. Ross, 4213 Prather Ave., St. Louis 9, Mo., and Charles H. Elbreder, 14 Lynnbrook Drive, St. Louis 24, Mo.

No Drawing. Filed Dec. 24, 1956, Ser. No. 630,069

5 Claims. (Cl. 167—53)

This invention relates to improvements in chemical preparations and processes for preventing and curing diseases in aquarium fish and in particular is concerned with an antibiotic composition which may be added to aquarium waters to prevent and cure fish diseases.

In the past it has been found that aquarium fish are quite susceptible to diseases such as fin rot, tail rot, body fungus, mouth fungus and slime bacillus which can eventually cause death of the fish. It has further been found that when fish are transported in tanks and the like that they bruise easily and are very susceptible to bacterial infection in the nature of the above-mentioned diseases.

By means of the present invention there has been provided an antibiotic chemical preparation which can be added to the aquarium water to cure the above mentioned diseases or to prevent the formation of these diseases when the preparation is added to the water in which the fish are transported. It has further been found as a signal feature of this invention that the chemical preparation can be used in so-called community tanks, where a number of different fish are kept, to minimize stress and agitation of the fish when there are environment changes or when new fish are added to the tank.

Through this invention it has been found that penicillin G potassium and streptomycin sulfate (base) have a very advantageous conjoint effect when added to aquarium water to control mouth fungus, tail rot, slime bacillus, fin rot and body fungus. This antibiotic chemical preparation has the beneficial function of being effective against both gram negative and gram positive organisms to prevent their formation or spread and growth.

The chemical preparation of the penicillin G potassium and streptomycin sulfate base have very important characteristics which lend themselves very advantageously to use for control of fish diseases in aquariums. Thus the product is soluble as is required for aquarium use and is free from water soluble impurities. Further the composition is compatible with most water supplies and no visible turbidity occurs in solution. It is also important that there be no discoloration of the aquarium water and this is achieved in this invention since the chemical preparation is colorless.

As a further requirement for aquarium use the chemical preparation is adapted to be used in accurate measured dosage form, in the form of tablets. Also, the preparation is found not to effect plants or snails that might be found in the aquarium, nor is its efficiency altered by aeration. Since most aquariums are used within a temperature range of 50 to 90 degrees Fahrenheit, and have an effective pH between 6.8 and 7.2, the antibiotic chemical preparation must be effective within these limits and it has been found that this is the case for the antibiotic preparation of this invention. Further the preparation is stable to compression and it is found not to be removed by the normal aquarium filtration such as for sand or glass wool filters.

Accordingly, as a result of this invention there has been provided an antibiotic chemical preparation which organisms and can be effectively used and from negative to control and prevent fish diseases. The antibiotic chemical preparation is simple to use and the process for using it is adapted to be easily followed by aquarium owners in a simple and effective manner. By very extensive testing the antibiotic chemical preparation has been found to be very effective in the control of fish diseases and in saving the lives of fish that would otherwise die. The preparation is relatively inexpensive in cost and simple to employ and requires no complicated application apparatus and thus is very well suited for simple and effective use in home aquariums.

Accordingly, it is the primary object of this invention to provide a chemical preparation and process for controlling fish diseases that are commonly encountered in aquariums.

It is a further object of this invention to provide a chemical preparation and process for preventing and controlling fin rot, tail rot, body fungus, mouth fungus, and slime bacillus in fish aquariums by an antibiotic chemical preparation that is simple to apply to aquariums.

It is yet a further object of this invention to provide a chemical preparation and process for controlling aquarium fish diseases through the use of an antibiotic preparation which possesses both gram positive and gram negative organism effectiveness and which is adaptable for use in fish aquariums.

Still another object of this invention is to provide an antibiotic chemical preparation and process for use in fish aquariums to prevent stress and agitation and provide for beneficial acclimation of fish in community tanks when the environment of the aquarium is changed or new fish are added.

Still a further object of this invention is to provide an antibiotic chemical preparation and process for using the same in fish aquariums through the use of penicillin G potassium and streptomycin sulfate (base) having effectiveness against gram positive and gram negative organisms and in which there is full compatability in the fish aquarium.

Yet another object of this invention is to provide a chemical preparation for aquarium water that is not harmful to plants, snails or the like and can be repeatedly replenished as required by merely adding it to the water.

Still another object of this invention is to provide an antibiotic chemical preparation and a simple process for using the same in fish aquariums in which the antibiotic chemical preparation can be easily measured out and applied to the aquarium by relatively unskilled aquarium owners.

Still another object of this invention is to provide an antibiotic chemical preparation for the prevention and control of fish diseases which can be marketed in packaged tablet form and used in a simple process by measuring out certain dosages to aquarium waters without any special mixing required by the aquarium owner.

Further objects of this invention will appear in the detailed description which follows and will be further apparent to those skilled in the art.

The antibiotic chemical preparation of this invention can be easily prepared by mixing pencillin G potassium and streptomycin sulfate base together in desirable ratios. It has been found that for disease prevention and curing each gallon of water treated should have pencillin G potassium in a range from 20,000 units penicillin to as high as 100,000 units penicillin with no adverse effect on different species of fish being observed at the higher concentration. Preferably, 30,000 units penicillin G potassium are employed per gallon of water. The streptomycin sulfate base may range from as low as 10 mgm. to as high as 100 mgm. without adverse effect on different specie of fish. However, preferably about 15 to 30 mgm. of streptomycin sulfate base has been found to be preferable, but the streptomycin sulfate base may be advantageously used within the described ranges or even in greater amounts, where desired. The above mixtures may be employed with sodium sulfate as a binder and then put into tablet form so that the mixture can be conveniently packaged for simple use in aquariums by home-owners and the like. The chemical composition, additionally could be made in liquid form if used immediately. Also the powdered form may be employed for larger aquariums, e.g., breeders of fish, but the tablet form is preferred because of its simplicity and adaptability in usage. The above concentrations and proportions are those that are most conveniently employed for the control and prevention of the major aquarium disease of fin rot, tail rot, mouth fungus, body fungus and slime bacillus.

For employment of the antibiotic chemical preparation in aquariums for fish acclimations to environment changes as litle as 10,000 units penicillin G potassium and 5 mgm. streptomycin sulfate base may be employed per gallon of water. Observation of fish has shown that upon the addition of the composition of this invention, rapid acclimation and adjustment of the fish to different environments was accomplished. Chlorotetracycline and terramycin may also be employed for purposes of acclimation. However, the latter two compounds have disadvantages since they cause discoloration of the water and turn it murky after two or three days, they also cause an unedsirable reduction in pH.

Numerous tests have been employed to determine effectiveness of this invention. These tests have been related to other control tests employing no antibiotic preparation and have been found to demonstrate greatly improved results for employment in aquariums. Also, other chemicals such as quinine sulphate, acriflavine, methylene blue, malachite green, potassium permanganate, gentian violet, and mercurochrome as well as other antibiotics as aureomycin veterinary soluble and tinted, terramycin, bacitracin, polymyxin B, have been employed and found to be undesirable for employment in aquariums through one or more reasons.

As previously pointed out, the employment of the antibiotic chemical preparation in aquariums should be such that it is compatible with the water supply, that no visible turbidity occurs and there is no discoloration of the aquarium water and that the ingredients should not be removed by normal aquarium filtration. Further there should be no adverse effect on aquarium plants or snails and the agent should not be altered by aeration and should be effective between 50 and 90 degrees Fahrenheit and a pH between 6.8 and 7.2. The water soluble antibiotic chemical preparation of this invention has been found to be fully satisfactory for all these requirements in fish aquariums in controlling diseases. As actual examples there are listed below test results shown in Tables I through V for varying species of aquarium fish to show the effectiveness of the antibiotic chemical preparation in this invention against fin rot, tail rot, body fungus, mouth fungus and slime bacillus. In all these tests the most effective concentration of 30,000 units of penicillin G potassium and 15 mgm. of streptomycin sulfate base was employed per gallon of water.

In Table I below, the antibiotic preparation of this invention was employed with three species of infected fish, i.e., goldfish, guppies and minows to show the effectiveness against fin rot. The tests were made in comparison against a control in which no agent was employed and it is seen that the fish that survived through the use of the antibiotic chemical preparation of this invention averaged about 75% of those infected.

TABLE I

*Fin rot*

| Specie | No. Treated | No. Survived in Treated Water | Percent Saved in Treated Water | No. Survived in Control |
|---|---|---|---|---|
| Goldfish | 12 | 10 | 73 | 0 |
| Guppies | 12 | 3 | 3 | 0 |
| Minnows | 175 | 140 | 80 | 7 |

In Table No. II the test was carried out in the same manner as the test of Table No. I against the same types of fish and the percentage of surviving fish infected with tail rot was even higher in an average of 85%.

TABLE NO. II

*Tail rot*

| Specie | No. Treated | No. Survived in Treated Water | Percent Saved | No. Survived in Control |
|---|---|---|---|---|
| Goldfish | 10 | 8 | 80 | 2 |
| Guppies | 10 | 9 | 90 | 0 |
| Minnows | 25 | 21 | 84 | 3 |

In Table No. III the test was carried out to show the effectiveness against body fungus and slime bacillus for the same types of fish as treated in Tables I and II and it is observed that a high percentage of approximately 90% of the fish were saved between the thre species.

TABLE NO. III

*Body fungus and slime bacillus*

| Specie | No. Treated | No. Survived in Treated Water | Percent Saved in Treated Water | No. Survived in Control |
|---|---|---|---|---|
| Goldfish | 7 | 7 | 100 | 1 |
| Guppies | 5 | 4 | 80 | 1 |
| Minnows | 15 | 14 | 93 | 1 |

In Table No. IV tests were carried out in the same manner as those for Tables I to III to show the effectiveness against mouth fungus and the average of fish saved approximated almost 80% while almost no fish survived in the untreated control waters, similarly to all the tests enumerated above.

TABLE NO. IV

*Mouth fungus*

| Specie | No. Treated | No. Survived in Treated Water | Percent Saved | No. Survived in Control |
|---|---|---|---|---|
| Goldfish | 6 | 4 | 66⅔ | 0 |
| Guppies | 5 | 4 | 80 | 0 |
| Minnows | 10 | 9 | 90 | 0 |

In all the tests carried out in Tables I through IV the infected fish were found to be cured within 2 to 12 days, while the fish in the control died in a period ranging from 15 minutes to 2 days.

In Table No. V the tests were carried out in a community tank to show the effectiveness for acclimation to environmental changes for guppies, mollies and neons. It was found that for the guppies and mollies, 80 percent were saved while only 20 percent survived in the untreated control. For the neons all treated fish survived while only 40 percent in the untreated control survived. These tanks were of 30 gallon size and were provided with fine sand and glass wool filter media and were subjected to aeration in the rate of approximately 100 cubic inches/min. They were also provided with plants, snails and fish food. No adverse effect at all was observed upon the plants, snails or fish foods, nor was there any discoloration or turbidity to the water or loss of the agent through the filter media.

TABLE NO. V

*Community tank*

| Specie | No. Treated | No. Survived in Treated Water | Percent Saved | No. Survived in Control |
|---|---|---|---|---|
| Guppies | 5 | 4 | 80 | 1 |
| Mollies | 5 | 4 | 80 | 1 |
| Neons | 5 | 5 | 100 | 2 |

Accordingly, as a result of this invention it can be seen that the antibiotic chemical preparation of the penicillin G potassium and streptomycin sulfate base can be very efficiently and efficaciously employed to prevent and control aquarium diseases. The chemical preparation is easily prepared from readily available sources of supply and can be packaged so as to be conveniently sold to the aquarium home-owner user. The preparation is easily employed in measured dosage form by the aquarium owner since the quantities to be used per gallon of water of the antibiotic chemical preparation are provided in pre-mixed tablet form. These tablets may contain 10,000 units of penicillin G potassium and 10 mgm. streptomycin sulfate base. Thus for fish acclimation one tablet of the mixture may be employed for each gallon of aquarium water. This procedure for the addition of the preparation to the aquarium water can be repeated every two weeks for acclimation applications.

When fish show signs of ill-health or distress in the aquarium three of the tablets per gallon of water in the aquarium may be employed. The treatment of the antibiotic chemical preparation is especially good for newly acquired fish for acclimation and also as a precautionary measure during special periods of stress such as the first few days when fish are put in a new aquarium or where extreme temperature change is encountered or for miscellaneous movement and environment changes.

Where the fish continue to show ill-health after treatment with the antibiotic chemical preparation, it may be desirable to remove the diseased fish to a smaller aquarium or receptacle for additional treatment. The water in the aquarium to which they are removed should be pretreated with three tablets per gallon of water and if the disease persists after twenty-four to forty-eight hours the water should be changed and three more tablets per gallon of water should be added. This treatment can be continued every twenty-four to forty-eight hours until the fish improve.

Thus, by means of this invention there has been provided an antibiotic chemical preparation which is easily employed, in view of the tablet nature, by relatively unskilled aquarium owners. The antibiotic chemical preparation is very effective against the major aquarium fish diseases and can be used without any adverse effect upon conditions in the aquarium and does not harm plants or snails, commonly kept in the aquarium. It is a signal feature of this invention that the antibiotic chemical preparation can be very simply employed at low cost and with a high degree of effectiveness.

Various changes and modifications may be made in the antibiotic chemical preparation and the process of this invention as will be apparent to those skilled in the art. Such changes and modifications are within the scope and teaching of this invention as defined by the claims appended hereto.

What is claimed is:

1. A treated substantially neutral solution of fish containing water for aquarium use to aid in acclimation of fish to environment changes, said solution containing at least 10,000 units of penicillin and 5 milligrams of streptomycin per gallon of water, said solution being further characterized by its lack of turbidity and color, neutral effect on aquarium plants and animal life and having a pH between 6.8 and 7.2.

2. A process for treating fish containing aquarium water to aid aquarium fish in acclimation to environmental changes and to reduce stress and agitation when new fish are added to the aquarium which comprises adding to the water a water soluble mixture of penicillin and streptomycin, said penicillin being added in the amount of at least 10,000 units, and streptomycin being added in the amount of at least 5 milligrams per gallon of water.

3. A process for treating fish containing aquarium water to aid aquarium fish in acclimation to environmental changes and to reduce stress and agitation when new fish are added to the aquarium which comprises adding to the water a water soluble mixture of penicillin and streptomycin, said penicillin being added in the amount of at least 10,000 units, and streptomycin being added in the amount of at least 5 milligrams per gallon of water and repeating the addition of penicillin and streptomycin after a period of about two weeks.

4. A process for treating fish containing aquarium waters to prevent and control fish diseases which comprises adding to the water a water soluble mixture of penicillin and streptomycin, said penicillin being added in the amount of at least 20,000 units and the streptomycin being added in the amount of at least 10 milligrams per gallon of water and repeating the addition of penicillin and streptomycin after one to two days.

5. The process of claim 4 in which the penicillin is added in the amount of about 30,000 units and the streptomycin is added in the amount of about 15 to 30 milligrams per gallon of water.

References Cited in the file of this patent

Clinical Med.: vol. 2, 1955, pp. 355, 357 and 360.

Axelrod: Handbook of Tropical Aquarium Fish, 1955, pp. 141, 142 and 146, McGraw-Hill Co., New York.

Waksman: Streptomycin, 1949, pp. 223 and 466, Williams and Wilkins Co., Baltimore, Md.

U.S. Dispensatory, 25th ed., 1955, pp. 1560 and 1561, Lippincott Co., Philadelphia, Pa.

U.S. Disp., 24th ed., 1947, Lippincott Co., pp. 836–838, 1335, 1336.

The Aquarium, vol. 28, No. 10, October 1954, p. 3 ads.